United States Patent [19]
Yamaguchi et al.

[11] Patent Number: 5,963,004
[45] Date of Patent: Oct. 5, 1999

[54] STEPPER MOTOR CONTROLLER USED IN A DOCUMENT READING DEVICE

[75] Inventors: Hiroshi Yamaguchi, Nagoya; Motonobu Ando, Iwakura, both of Japan

[73] Assignee: Brother Kogyo Kabshiki Kaisha, Nagoya, Japan

[21] Appl. No.: 08/890,425

[22] Filed: Jul. 9, 1997

[30] Foreign Application Priority Data

Jul. 9, 1996 [JP] Japan ................................ 8-178777

[51] Int. Cl.$^6$ .................................................. H02K 37/00
[52] U.S. Cl. .......................................... 318/685; 318/696
[58] Field of Search .................................. 318/560–685, 318/699, 715, 703, 490; 356/357, 358, 359, 360; 355/51, 56, 55, 235, 200; 324/158 MG

[56] References Cited

U.S. PATENT DOCUMENTS

| | | | |
|---|---|---|---|
| 3,735,093 | 5/1973 | Kendall et al. | 235/61.1 |
| 4,215,302 | 7/1980 | Chiang | 318/696 |
| 4,280,084 | 7/1981 | Chiang | 318/696 |
| 4,641,073 | 2/1987 | Sawada | 318/696 |
| 4,743,848 | 5/1988 | Krimm et al. | 324/158 MG |
| 4,908,664 | 3/1990 | Ogura | 355/235 |
| 5,124,744 | 6/1992 | Ogura et al. | 355/51 |
| 5,315,226 | 5/1994 | Fehlauer et al. | 318/715 |
| 5,554,916 | 9/1996 | Kaneda et al. | 318/672 |
| 5,726,754 | 3/1998 | Andrews et al. | 356/357 |

FOREIGN PATENT DOCUMENTS

| | | |
|---|---|---|
| A-6-233072 | 8/1994 | Japan . |
| A-7-212525 | 8/1995 | Japan . |
| A-7-307837 | 11/1995 | Japan . |

*Primary Examiner*—Paul Ip
*Attorney, Agent, or Firm*—Oliff & Berridge, PLC

[57] ABSTRACT

A stepper motor controller that controls acceleration of a stepper motor so that, once the stepper motor is stabilized at 500 pps, acceleration of the motor is increased to 667 pps for four steps, during which time the speed of the stepper motor reaches about 900 pps. Then, acceleration of the stepper motor is increased to 1,000 pps, allowing the motor to increase to that speed without degeneration of the speed. In other words, when the stopper motor nears the maximum possible speed at an acceleration of 667 pps, the next acceleration is applied. In this way, acceleration of the stepper motor can be changed between levels having a great difference in driving frequency without causing the stepper motor to degenerate.

8 Claims, 4 Drawing Sheets

STEPPER MOTOR CONTROLLER USED IN A DOCUMENT READING DEVICE

BACKGROUND OF THE INVENTION

1. Field of the Invention

The present invention relates to a stepper motor controller for conveying an original document in a facsimile device, and more particularly to a stepper motor controller capable of accelerating a stepper motor in stages without causing the stepper motor to degenerate.

2. Description of the Prior Art

Facsimile devices read image data from a document. The image data in a main scanning direction Is read using a scanner device equipped with charge coupled devices (CCDs) while conveying the document in an auxiliary scanning direction. Since one line data on the document is read during a fixed reading period, a stepper motor is controlled so as to convey the original document one line for each reading period. Accordingly, the stepper motor is driven at a uniform speed from the moment it is started.

It is desirable to further increase the scanning speed for this method of scanning. To achieve this, it is necessary to increase both the scanning speed of the scanning device and the conveying speed of the stepper motor. Increasing the speed of the scanner is accomplished by improving the performance of the CCDs provided in the scanning device. However, increasing the conveying speed is difficult if the stopper motor must be started at a high speed. Therefore, a driving control is provided to drive the stepper motor at a low speed when the motor is started, and through-up control (accelerating control) is subsequently performed to gradually drive the motor at higher and higher speeds.

When performing through-up control, image data on the document must be read during acceleration. Therefore, the stepper motor is controlled so as to always convey one or a plurality of lines of the document in a duration of time that is an integral multiple of the reading period performed by the scanning device. As described in Japanese Patent Laid-Open Publications (Kokai) Nos. HEX-6-233072, HEI-7-212525, and HEI-7-307837, a document is read even during through-up control, by generating scanned data for a number of lines equivalent to the number of lines conveyed, although the data for every one or plurality of lines conveyed may be scanned a plurality of times.

However, in order to convey the document one or a plurality of lines over a time duration that is an integral multiple of the scanning period, accelerating control of the stepper motor cannot be performed gradually or continuously, but must be performed in stages having large differences in speed.

For example, if the reading period of a scanning device is 2 ms and one line of the document is conveyed by 4 step drives of the stepper motor, acceleration of the stepper motor must be executed in stages having driving frequencies 250 pps (pulses per second). 500 pps, 667 pps, and 1,000 pps, as shown in FIG. 5. When the stepper motor is driven at 250 pps, the duration of time required to convey the document one line is 8 times the reading period. The duration of time required to convey the original document one line at 500 pps is 4 times the reading period; at 667 pps, 3 times the reading period; and at 1,000 pps. 2 times the reading period.

Since the amount that the document is conveyed in one step of the stepper motor is always the same, the driving frequency and the driving speed of the stepper motor are proportional. Hence, as the driving frequency increases, so does the driving speed.

FIG. 6 is a graph showing the speed of a stepper motor that is accelerated by stages having the above-mentioned driving frequencies. The speeds shown on the graph are the angular speeds of the output shaft in the stepper motor that were measured using a non-contact laser Doppler method. In order to facilitate understanding, higher speeds are indicated at higher levels in the graph.

As shown in FIG. 6, the stepper motor is accelerated in stages from 500 pps to 667 pps. However, when accelerated from the driving frequency of 667 pps to 1,000 pps, the stepper motor cannot follow that acceleration and falls out of step or degenerates. Hence, when a stepper motor is accelerated in stages of driving frequencies greatly different in speed, the stepper motor cannot keep up and degenerate.

SUMMARY OF THE INVENTION

In view of the foregoing, it is an object of the present invention to provide a stepper motor controller capable of accelerating a stepper motor in stages without causing the motor to degenerate.

To achieve this and other objects, there is provided, according to one aspect of the invention, a stepper motor controller for a document reading device that includes a scanning device that scans an image on a document in a main scanning direction on a line basis, one line's worth of the image being scanned at a fixed scanning period, a conveying roller that conveys, in an auxiliary scanning direction perpendicular to the main scanning direction, the document to be scanned by the scanning device, and a stepper motor for driving the conveying roller. The stepper motor controller includes controlling means for controlling the stepper motor so that a time required for the conveying roller to convey the document one or a plurality of lines is an integral multiple of the fixed scanning period in the scanning device; first accelerating means for accelerating the stepper motor to one speed that is controllable with the controlling means; and second accelerating means for accelerating the stepper motor in stages to another speed that is controllable with the controlling means when the stepper motor being accelerated by the first accelerating means nearly reaches a maximum possible speed with acceleration by the first accelerating means.

According to the stepper motor controller of this configuration, the controlling means drives the stepper motor, which in turn drives the conveying roller, conveying the document in the auxiliary scanning direction. While the document is being conveyed in the auxiliary scanning direction, the scanning device scans the images on the document in the fixed scanning period. The controlling means drives the stepper motor so that the document is conveyed one or a plurality of lines by the conveying means in a time period that is an integral multiple of the scanning period. To achieve this time relationship, the first and second acceleration means are provided to accelerate the stepper motor in stages in which the speed can be controlled. The second acceleration means accelerates the stepper motor when the stepper motor nears the maximum speed possible by the first acceleration means. Hence, the stepper motor can be accelerated without causing it to fall out of step.

The stepper motor accelerated by the first acceleration means is further accelerated by the second acceleration means when the speed of the stepper motor nears the maximum speed. As a result, the stepper motor can be accelerated in stages, rather than continuously, without falling out of step or degeneration in speed. Rather than stabilizing the stepper motor before performing the next acceleration, as is performed in conventional controllers, the stepper motor controller performs the next acceleration before the stepper motor is stabilized. Therefore, the stepper motor can be driven at high speeds within a short time period without falling out of step.

In addition to the above effects, the stepper motor is accelerated to a high speed by the second acceleration means, allowing the stepper motor to be accelerated in steps within a range of high speeds without the stepper motor falling out of step.

According to another aspect of the invention, there is provided a stepper motor controller for accelerating a stepper motor in stages of predetermined speeds. The controller includes first accelerating means for accelerating the stepper motor at an initial acceleration rate; and second accelerating means for accelerating the stepper motor at a second acceleration rate when the stepper motor being accelerated by the first accelerating means nears the maximum possible speed with acceleration by the first accelerating means. Hence, the stepper motor can be accelerated in stages without causing it to fall out of step.

The second accelerating means accelerates the stepper motor to a maximum speed. According to this stepper motor controller, the stepper motor is accelerated to the maximum speed by the second acceleration means. Hence, without falling out of step, the stepper motor can be accelerated within a short duration of time and within a range of speed during which there is little torque.

BRIEF DESCRIPTION OF THE DRAWINGS

The above and other objects, features and advantages of the present invention will become more apparent from the following description when taken in conjunction with the accompanying drawings in which.

DETAILED DESCRIPTION OF THE PREFERRED EMBODIMENT

A stepper motor controller according to a preferred embodiment of the present invention will be described while referring to the accompanying drawings. The preferred embodiment is directed to a stepper motor controller used in a document reading section of a facsimile device.

Figure 1:
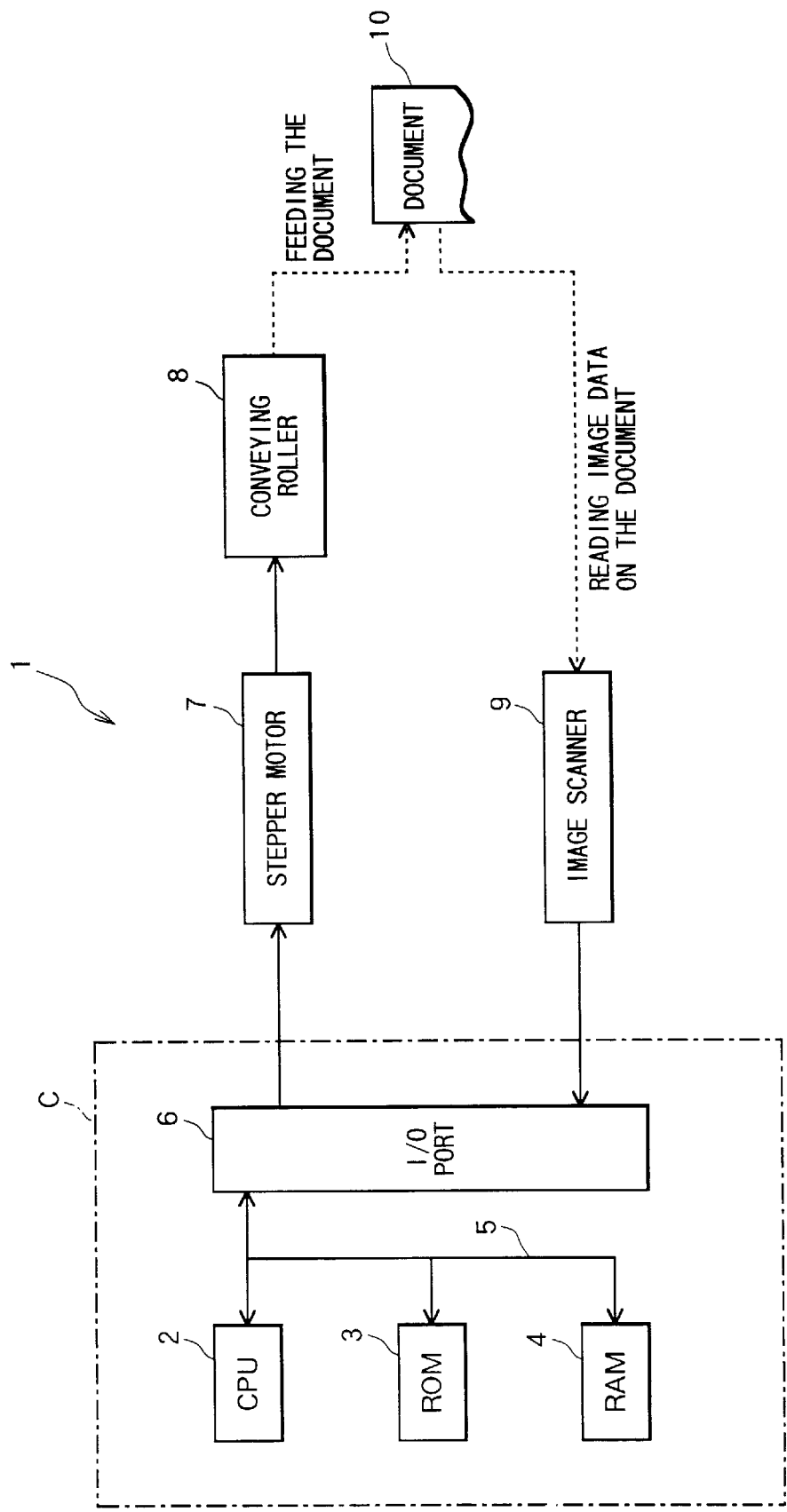
FIG. 1 is a block diagram showing the electrical configuration for a stepper motor controller of the embodiment of the invention.

FIG. 1 shows the electrical construction for part of the stepper motor controller 1 in this facsimile device, which is capable of scanning an image from a document 10. The stepper motor controller 1 is provided mainly with a control unit C; a stepper motor 7 that is driven based on drive signals output from the control unit C; a conveying roller 8 that is driven by the stepper motor 7 to convey the original document 10 in an auxiliary scanning direction; and an image scanner 9 for reading by means of CCDs in a main scanning direction images on the document 10 being conveyed in the auxiliary scanning direction by the conveying roller 8, for converting the read images into electric signals, and for outputting the result to the control unit C.

The control unit C includes a CPU 2 as the calculating means; a ROM 3 for storing control programs to be executed by the CPU 2, such as a drive control program for the stepper motor 7; a RAM 4 provided with a work area for use when executing control programs stored in the ROM 3 and a storage area for storing data read by the image scanner 9; bus lines 5 which connect each of the CPU 2, ROM 3, and RAM 4; and an input/output (I/O) port 9 connected to one end of the bus lines 5 and through which the control unit C can be connected to the stepper motor 7 and the image scanner 9.

Next, the driving control for a stepper motor 7 of the above-described stepper motor controller 1 will be described with reference to FIG. 2. The stepper motor 7 is driven by 2-2 phase energization, conveying the document 10 one line every four steps. First, the stepper motor 7 is driven one step at 250 pps, which is one-fourth of the driving frequency when driven at a constant speed. Next, the stepper motor 7 is driven at 500 pps, or one-half of the driving frequency at a constant speed. At the beginning of this stage, the image scanner 9 begins scanning the document 10. After being driven for 32 steps at 500 pps, the stepper motor 7 is driven for 4 steps at 667 pps, which is two-thirds of the driving frequency at a constant speed. Finally, for the remainder of the original document 10, the stepper motor 7 is driven at 1,000 pps, which is the fastest speed and a constant driving frequency for the stepper motor controller 1.

The reading period T of the image scanner 9 is 2 ms. When the stepper motor 7 is being driven constantly at 1,000 pps, one line of the document 10 is being conveyed in twice the time required for the reading period T. Hence, image data on the document 10 can be read twice by the image scanner 9. The image scanner 9 can be configured to read only once during this time, but two reads are performed here to obtain a higher quality result. When the stepper motor 7 is being driven at 500 pps, one line of the original document 10 is being conveyed in four times the reading period T. Therefore, the image scanner 9 can read the image data for one line four times. When the stepper motor 7 is being driven at 667 pps, one line of the document 10 is being conveyed in three times the reading cycle T. Hence, the image scanner 9 can read the image data for one line three times. Whether one line of image data is read twice, three times, or four times by the image scanner 9, all the scanned data for that line is processed by the control unit C and converted to one line of data.

Figure 2:
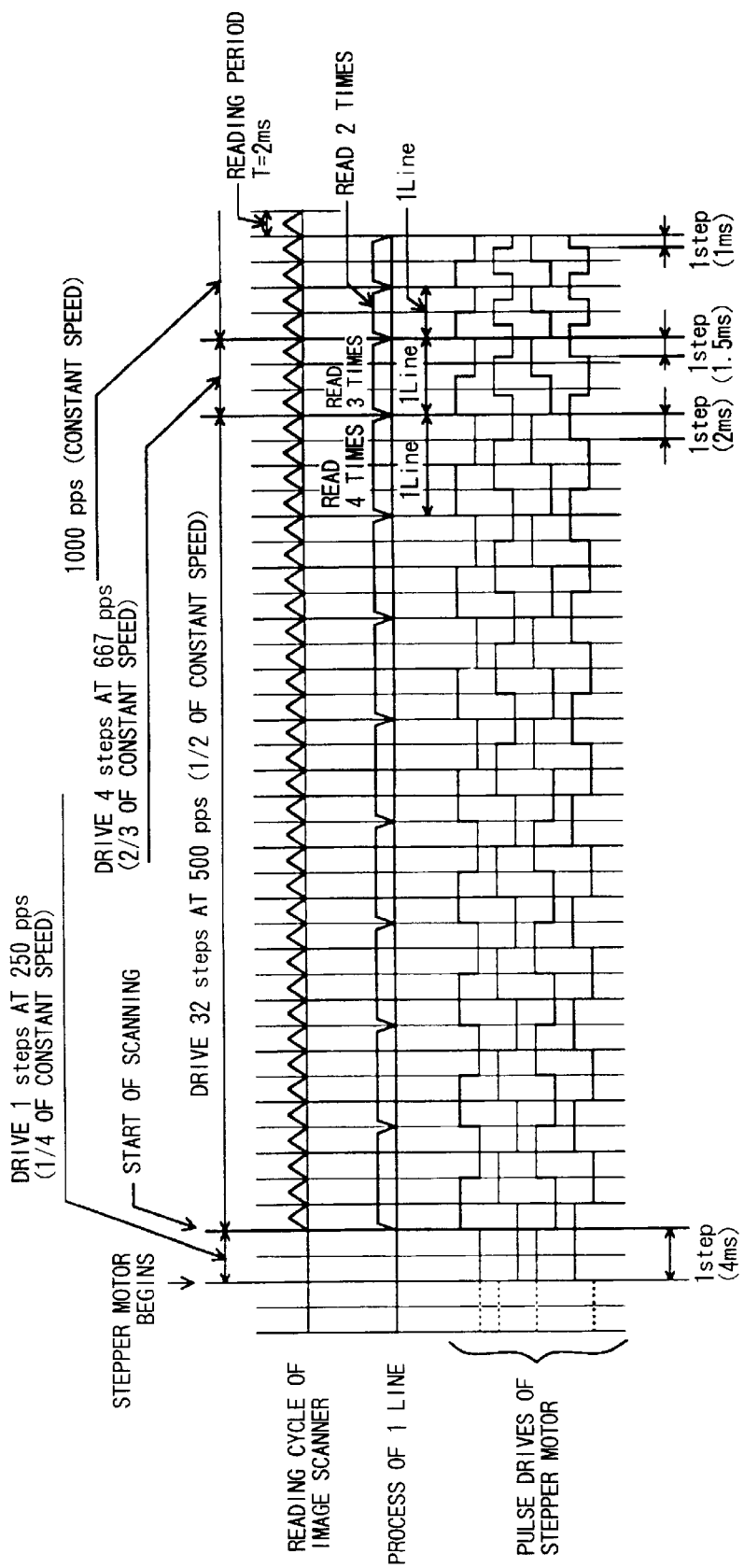
FIG. 2 is a diagram showing the relations to time of the driving operations of the stepper motor and the scanning operations of the scanning device for the stepper motor controller.
Figure 3:
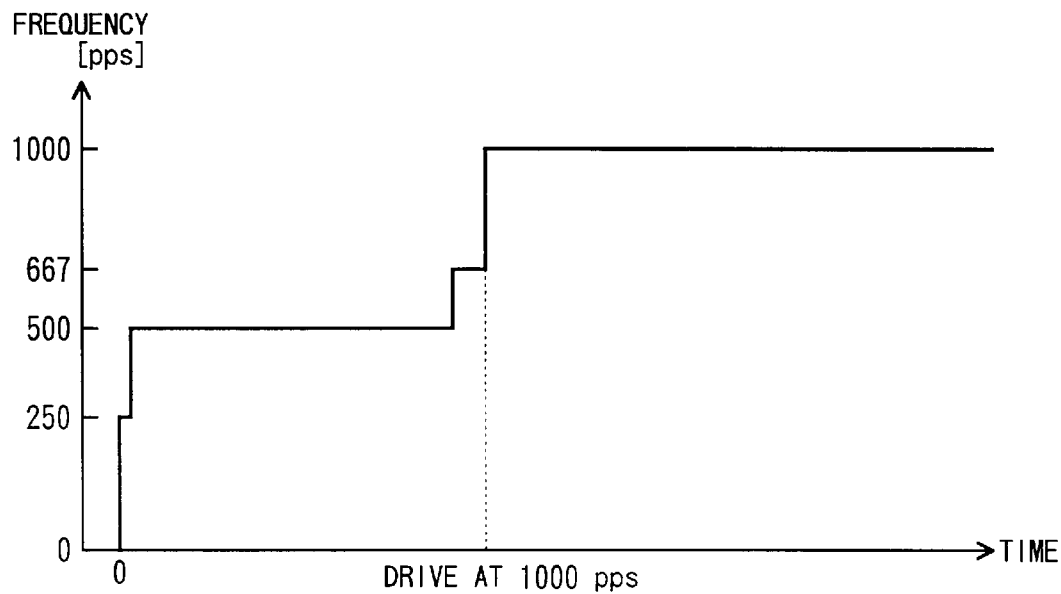
FIG. 3 is a diagram showing the acceleration of the stepper motor.

FIG. 3 shows the acceleration of a stepper motor 7 driven according to the diagram in FIG. 2. As described above and shown in FIG. 6, conventional stepper motors driven stably at 667 pps will go out of step or degenerate when accelerated to 1,000 pps. However, the stepper motor 7 of the present invention completes only four steps at 667 pps and then accelerates to 1,000 pps. For this reason, the stepper motor 7 accelerates to the next driving frequency of 1,000 pps before stabilizing at 667 pps.

Figure 4:
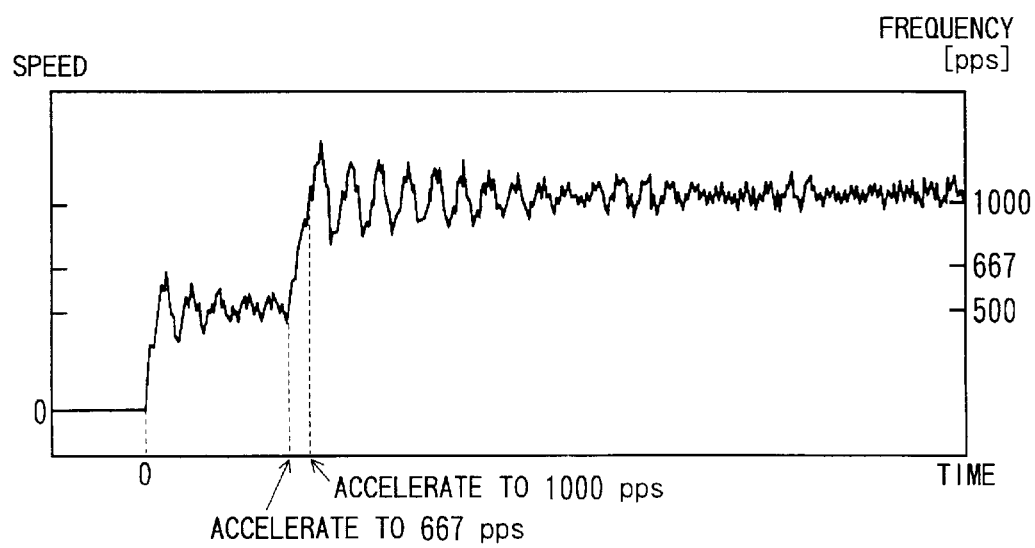
FIG. 4 is a graph representing the measured speeds of the stepper motor.

The graph in FIG. 4 shows the measured stepper motor speeds when the stepper motor 7 is controlled according to the chart in FIG. 2. The speeds shown here are the angular speeds of the output axis on the stepper motor 7 and were measured using a non-contact laser Doppler method. Faster speeds are shown at higher levels in the graph to facilitate understanding.

As shown in FIG. 4, the stepper motor 7, having been stabilized at a driving frequency of 500 pps, is driven for 4 steps at 667 pps at which time the speed of the stepper motor 7 surpasses 667 pps and reaches the equivalent of about 900 pps. The stepper motor 7 can then be accelerated in stages to 1,000 pps without falling out of step. In other words, when the speed of the stepper motor 7 being driven at 667 pps nears the maximum speed, the stepper motor 7 can be accelerated to the next frequency without falling out of step or degeneration, even if the difference between driving frequencies is large as is the difference between 667 pps and 1,000 pps.

The value of 4 for the number of steps to drive the stepper motor 7 at 667 pps was obtained from tests in which the speed of the stepper motor 7 was measured. In the present embodiment, one line of the document 10 is conveyed by driving the stepper motor 7 for 4 steps. Hence, any appropriate multiple of 4 (4, 8, 12, . . . ) can be selected as the number of steps to drive the stepper motor 7 at 667 pps.

The following formula can be used to calculate the number of steps.

$$n \approx (\frac{1}{2}+N) \times (1/fn) \div (1/f)$$

In the formula, n is the number of stops selected; N is zero or a natural number (0, 1, 2, . . . ) fn is the natural frequency (Hz) of the stepper motor; and f is the driving frequency (pps). From experimentation it is understood that the smaller number for N the better. The larger N becomes the more stable the stepper motor 7, and therefore, the smaller the fluctuations in speed of the motor repeating at a predetermined synchronization and the smaller the unevenness of maximum speeds for each period.

The value for the characteristic frequency fn is obtained from experimentation. In the present embodiment, a value of 90 Hz was found for fn. Therefore, If N is set at 0, when f=667 pps, the number of steps n according to the formula is 3.706≈4, which is the number of steps used in the description above.

Hence, when the speed of the stepper motor 7 accelerated at a driving frequency of 667 pps nears its maximum speed at that acceleration rate, the stepper motor controller 1 begins to accelerate the stepper motor 7 at 1,000 pps. Therefore, acceleration of the stepper motor 7 can be increased such a large amount as from 667 pps to 1,000 pps without the stepper motor 7 falling out of step.

Figure 5:
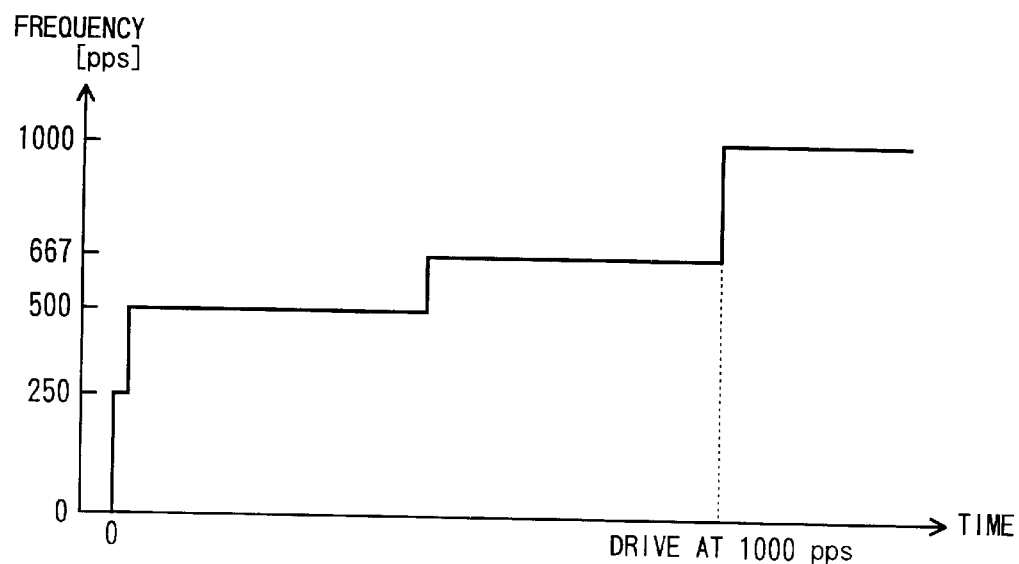
FIG. 5 is a diagram showing the acceleration of a conventional stepper motor.
Figure 6:
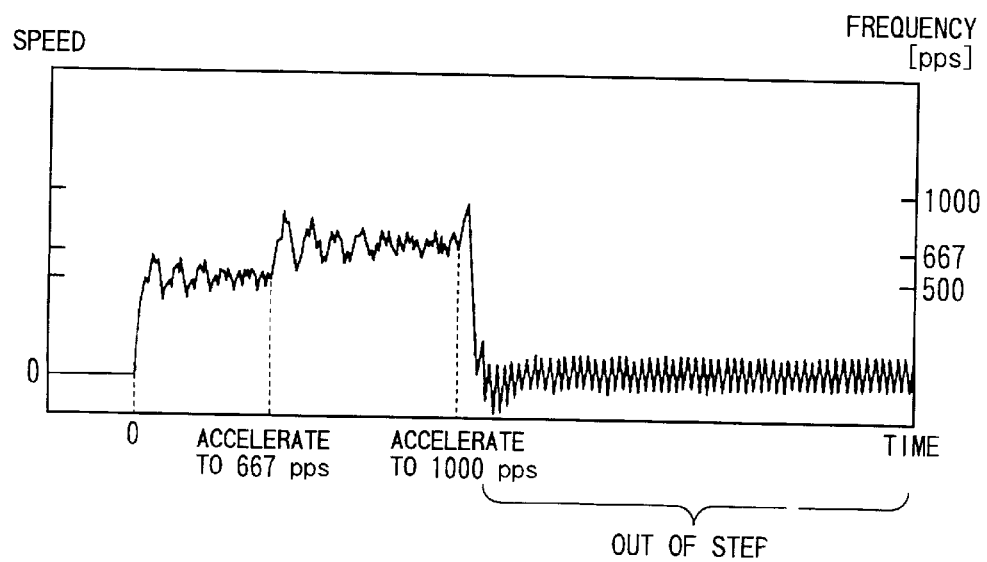
FIG. 6 is a graph representing the measured speeds of a conventional stepper motor.

As shown in FIGS. 5 and 6, the conventional stepper motor 7 changes to the next acceleration after the speed of the accelerated stepper motor 7 is stabilized. With the stepper motor controller 1 of the present embodiment, however, changing the acceleration from 667 pps to 1,000 pps is performed before the speed of the stepper motor 7 accelerated at 667 pps is stabilized. Thus, it is possible to drive the stepper motor 7 to its maximum speed of 1,000 pps in a shorter amount of time than that required by the conventional stepper motors. Accordingly, the starting point for driving the stepper motor 7 at 1,000 pps occurs earlier in FIG. 3 than in FIG. 5. Further, since acceleration is changed, as from 667 pps to 1,000 pps, when the stepper motor 7 is accelerating to Its maximum speed at the acceleration of 667 pps, acceleration can be controlled reliably within a range of speed having a low torque, without the stepper motor 7 falling out of step.

As described in the embodiment above, the stepper motor 7 is controlled so as to be accelerated in stages of predetermined speeds so that one line of the document 10 is conveyed by the conveying roller 8 in a duration of time that is an integral multiple of the scanning cycle in the image scanner 9. It is also possible to accelerate the stepper motor 7 to speeds at which a plurality of lines of the original document 10 are conveyed in a duration of time that is an integral multiple of the scanning cycle.

For example, in the embodiment described above, one line of the document 10 is conveyed over 4 steps. However, if the configuration of the stepper motor controller 1 is changed to convey one line of the document 10 over 2 steps, then one line of the document 10 will be read only once by the image scanner 9 when the stepper motor 7 is driving at a constant speed (1,000 pps). When the stepper motor 7 is accelerated at 500 pps, or one-half of the constant speed, one line of the original document 10 will be read twice by the image scanner 9 when the stepper motor 7 is accelerated at 667 pps, or two-thirds of the constant speed, two lines of the original document 10 will be read three times by the image scanner 9. Therefore, when the stepper motor 7 is accelerated at 667 pps, it is possible to configure the stepper motor controller 1 to generate two lines of data based on data read three times by the image scanner 9. For example, data read in the first and third scans can be used as two lines of data, while data from the second is discarded.

While only one exemplary embodiment of this invention has been described in detail, those skilled in the art will recognize that there are many possible modifications and variations which may be made In this exemplary embodiment while yet retaining many of the novel features and advantages of the invention. Accordingly, all such modifications and variations are intended to be included within the scope of the appended claims.

For example, the stepper motor controller 1 of the embodiment described above was used in the document reading section of a facsimile device. However, it would be apparent that this controller can be used for other uses and in other devices.

What is claimed is:

1. A stepper motor controller for a document reading device that includes a scanning device that scans an image on a document in a main scanning direction on a line basis, one line's worth of the image being scanned at a fixed scanning period, a conveying roller that conveys, in an auxiliary scanning direction perpendicular to the main scanning direction, the document to be scanned by the scanning device, and a stepper motor for driving the conveying roller, the stepper motor controller comprising:

controlling means for controlling the stepper motor so that a time required for the conveying roller to convey the document one or a plurality of lines is an integral multiple of the fixed scanning period in the scanning device;

first accelerating means for accelerating the stepper motor to one speed that is controllable with the controlling means; and second accelerating means for accelerating the stepper motor in stages to another speed that is controllable with the controlling means when the stepper motor being accelerated by the first accelerating means nearly reaches a maximum possible speed with acceleration by the first accelerating means.

2. A stopper motor controller for accelerating a stepper motor in stages of predetermined speeds, the controller comprising:

first accelerating means for accelerating the stepper motor at an initial acceleration rate; and second accelerating means for accelerating the stepper motor at a second acceleration rate when the stepper motor having been accelerated by the first accelerating means is substantially at a maximum possible speed with acceleration by the first accelerating means.

3. The stepper motor controller as claimed in claim 2, wherein the second accelerating means accelerates the stepper motor to the maximum speed.

4. A stepper motor controller for accelerating a stepper motor in stages of predetermined speeds, the controller comprising:

first accelerating means for accelerating the stepper motor at an initial acceleration rate; and second accelerating means for accelerating the stepper motor having been accelerated by the first accelerating means, the second accelerating means accelerating the stepper motor at a second accelerating rate before the stepper motor is stabilized to rotational speed achieved by acceleration with the first accelerating means.

5. The stepper motor controller as claimed in claim 4, wherein the second accelerating means accelerates the stepper motor to a maximum speed.

6. A document reading device comprising:

a scanning device that scans an image on a document in a main scanning direction on a line basis, one line's worth of the image being scanned at a fixed scanning period;

a conveying roller that conveys, in an auxiliary scanning direction perpendicular to the main scanning direction, the document to be scanned by the scanning device;

a stepper motor that drives the conveying roller;

controlling means for controlling the stepper motor so that a time required for the conveying roller to convey the document one or a plurality of lines is an integral multiple of the fixed scanning period in the scanning device;

first accelerating means for accelerating the stepper motor to one speed that is controllable with the controlling means; and second accelerating means for accelerating the stepper motor in stages to another speed that is controllable with the controlling means when the stepper motor being accelerated by the first accelerating means nearly reaches a maximum possible speed with acceleration by the first accelerating means.

7. A document reading device comprising:

a scanning device that scans an image on a document in a main scanning direction on a line basis, one line's worth of the image being scanned at a fixed scanning period;

a conveying roller that conveys, in an auxiliary scanning direction perpendicular to the main scanning direction, the document to be scanned by the scanning device;

a stepper motor for driving the conveying roller; and a stepper motor controller that accelerates the stepper motor in stages of predetermined speeds, the step motor controller comprising first accelerating means for accelerating the stepper motor at an initial acceleration rate, and second accelerating means for accelerating the stepper motor at a second acceleration rate when the stepper motor being accelerated by the first accelerating means nears the maximum possible speed with acceleration by the first accelerating means.

8. The document reading device as claimed in claim 7, wherein the second accelerating means accelerates the stepper motor to a maximum speed.

* * * * *